Feb. 20, 1968 A. W. HAYDON ET AL 3,370,189
STEPPER MOTOR HAVING A STATOR BIASING MAGNET
Original Filed Sept. 8, 1964 3 Sheets-Sheet 1
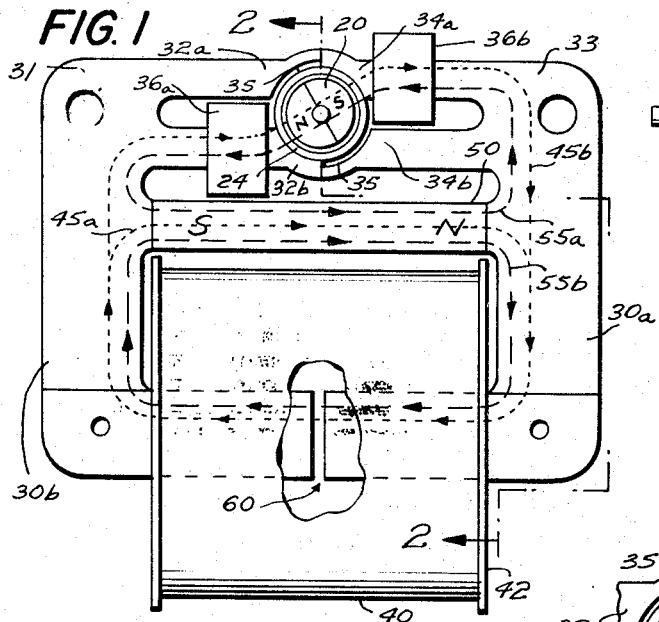
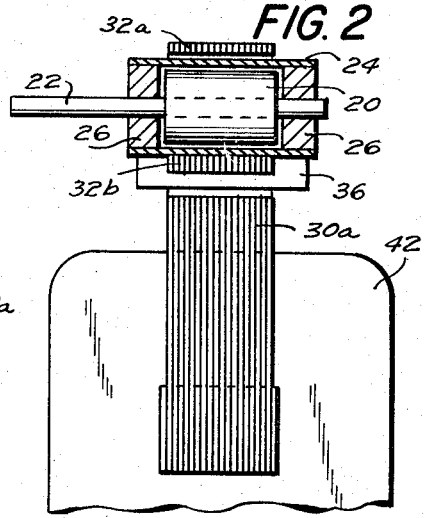
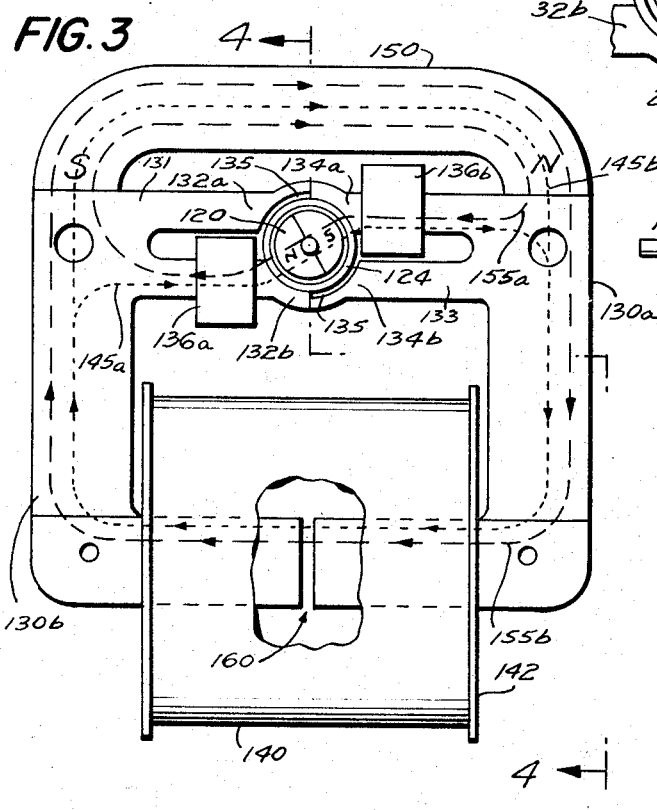
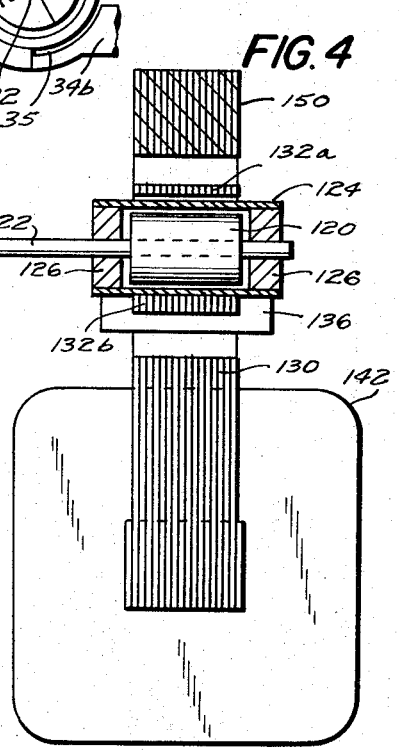

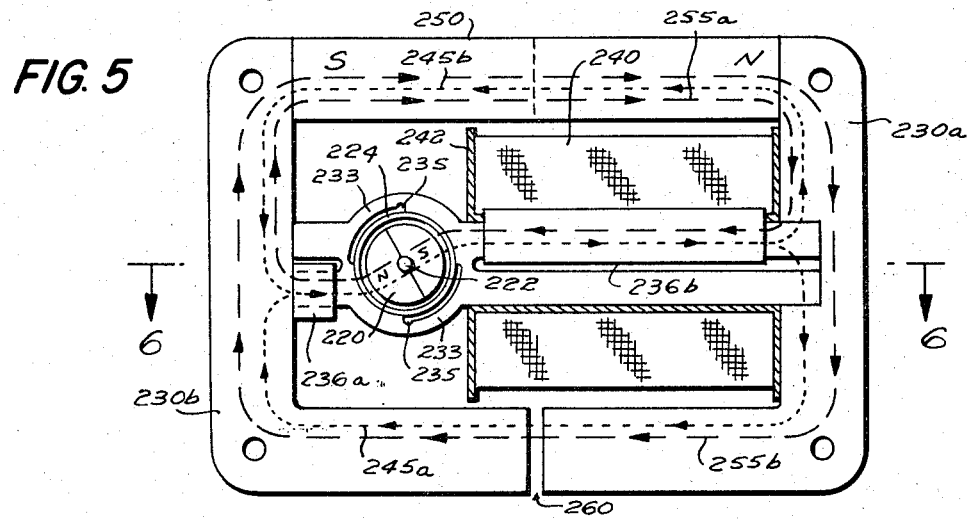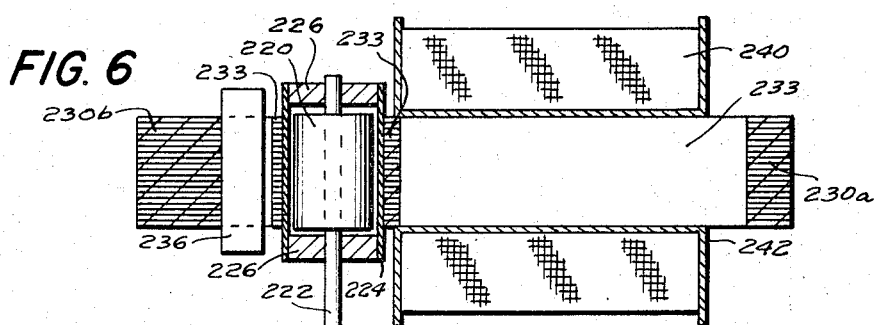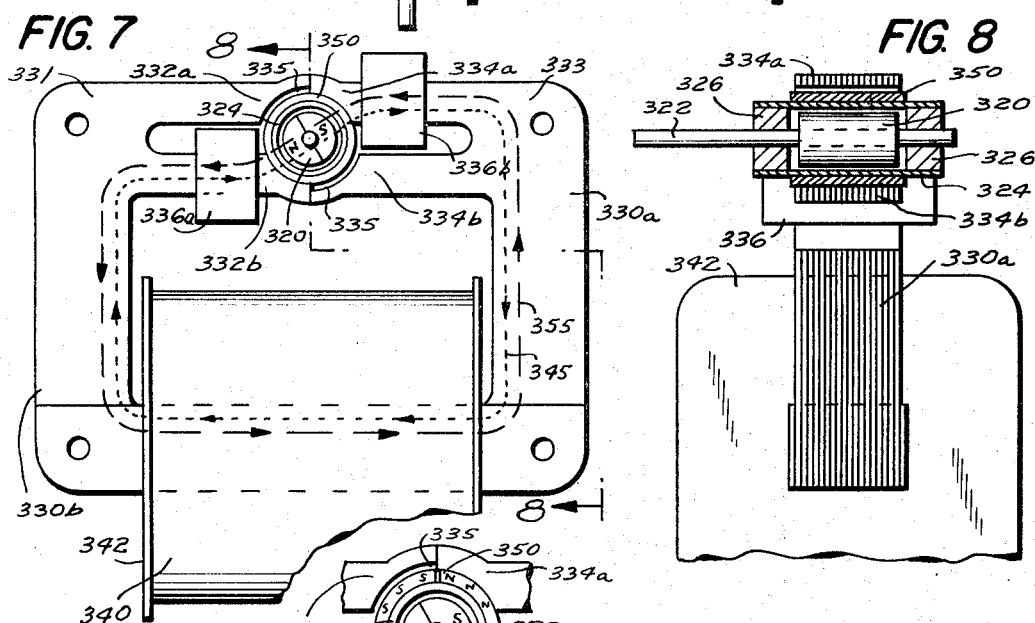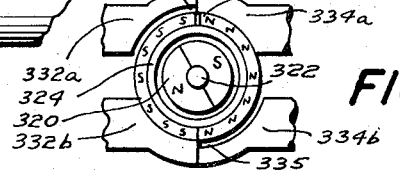

United States Patent Office 3,370,189
Patented Feb. 20, 1968

3,370,189
STEPPER MOTOR HAVING A STATOR
BIASING MAGNET
Arthur W. Haydon, Huntington, Edward Herbert III, Farmington, and William D. Riggs, Woodbury, Conn., assignors to Tri-tech, Inc., a corporation of Connecticut
Continuation of application Ser. No. 394,669, Sept. 8, 1964. This application Oct. 14, 1966, Ser. No. 595,286
8 Claims. (Cl. 310—49)

ABSTRACT OF THE DISCLOSURE

A pulsed or stepper motor with a pair of salient stator poles, a permanent-magnet cylindrical rotor, and a stator biasing magnet arranged in either series or parallel magnetic circuit relationship with the stator flux for producing a rotor advance of 360 electrical degrees for each electrical pulse applied to the stator field coil, together with shading coils and a non-uniform rotor-stator air-gap spacing for imparting a self-starting and unidirectional characteristic to the motor.

Cross-reference to related application

This application is a continuation of our copending application, Ser. No. 394,669, filed Sept. 8, 1964, now abandoned for Electric Rotating Machine.

Background of the invention

The present invention relates to an electric rotating machine of novel and versatile design which, in various embodiments and modifications, may be operated in any of several types of modes.

A principal embodiment of the invention relates to a type of pulsed or stepper motor which requires only two input lead wires for operation and rotates a full 360° cycle upon the application of but a single pulse. In other important embodiments the rotating machine of the present invention may be operated as a "brushless" DC motor energized from a source of DC potential through an inverter circuit or as a self-communicating DC motor activated by unipolar pulses of electric potential. All of the disclosed motor embodiments possess certain constructional features and advantages which are novel and unique to electric rotating machines of these general types, and each embodiment exhibits markedly improved performance and operating characteristics when compared to conventional machine designs heretofore known to the art.

Summary of the invention

The stepper motor embodiment of the present invention is a two terminal electric device incorporating but a single field coil, and a full 360° rotation of the rotor member is accomplished upon the application of each electrical pulse. To achieve this result, a permanent magnet element is substituted for one of the two field coils heretofore required in many conventional stepper motor designs. This permanent magnet element provides a bias field of magnetic flux which passes through the rotor member at all times in a predetermined direction. However, upon energization of the single field coil, a second magnetic flux is then produced which flows through the rotor member in a direction directly opposite that of the bias flux.

In certain good embodiments, the flux paths for the field coil and the permanent magnet, while passing through the rotor member in opposite directions, are in parallel with each other throughout the remainder of the magnetic circuit of the motor, thereby minimizing the demagnetizing effect produced by the portion of the flux field from the coil which is applied across the bias magnet. In other arrangements, the respective flux paths are arranged in series to further simplify the motor construction.

The amplitude of the flux produced by the field coil is sufficiently large to momentarily cancel out the bias flux and produce a net magnetic field in the opposite direction through the rotor member. This reversal in direction of the composite stator flux passing through the rotor causes the magnetized rotor member to rotate 180 electrical degrees. In cases in which the rotor is divided into but two zones of opposite magnetic polarity (i.e., a two pole rotor), the rotor revolves 180 mechanical degrees, as well as 180 electrical degrees, when the energizing pulse is applied to the stator field coil.

Upon the de-energization of the field coil at the termination of the applied pulse, flux flowing through the rotor reverts to that provided by the bias magnet alone. Because the flow of the bias flux through the rotor is oppositely directed from that produced by the field coil, a second reversal in the stator flux occurs, and the rotor now revolves an additional 180 electrical degrees. (When the motor is provided with a unidirectional starting characteristic according to the means described below, all rotor rotational advances are in the same direction and are thus additive.) For a two-pole rotor, this second advance, due to the flux reversal occurring upon the termination of the energizing pulse, completes a full cycle of revolution and returns the rotor to the position it occupied just prior to the application of the energizing pulse. In other words, the rotor member turns 180° when the energizing current is applied to the stator field coil and a further 180° when the current is removed.

The rotor thus rotates a full 360 electrical degrees upon the application of each pulse. All the pulses are applied to a single field coil of the motor and are of the same polarity, thus there is no need for the external switching or logic circuitry used with conventional stepper motors to alternate the application of the pulses between each of two or more separately-wound field coils in order to reverse the flux polarity in the motor and obtain a 360° rotation of the rotor. Moreover, the inclusion of a biasing magnet in the motor structure in lieu of a second field coil greatly improves the efficiency of the motor, especially in applications where the pulse repetition rate is relatively low, since no energy is required from the power source to maintain flux flow through the rotor between pulses.

Another advantageous feature provided by the inclusion of a magnetic biasing field through the rotor and stator structure is the quick stopping action which is produced, upon the removal of electrical energization from the field coil, due to the combined effects of both electrodynamic braking and the novel locking action provided by the interaction of the flux of the biasing magnet with that of the rotor.

Stepper motors constructed in accordance with the teachings of the present invention may be readily adapted for "brushless" or self-commutating DC operation with but minor modification. For such operation the source of DC potential is converted either into an alternating waveform or into a series of unipolar pulses before its application to the field coil of the motor. This conversion can be readily accomplished by any of a variety of suitable electronic, electromechanical or other means which would periodically invert or interrupt the DC energizing current applied to the stator field coil of the motor. In several advantageous arrangements, DC operation of these motor embodiments at a substantially constant speed may be achieved through the use of a synchronized pulse source, such as a tuning fork, crystal oscillator, etc.

It is therefore a principal object of the present invention to provide an electrical rotating machine which has certain important innovations and improvements in stator structure design and which is suitable for a wide variety of advantageous applications, including stepper and "brushless" DC motor operation.

It is another object of the present invention to provide an improved two-wire stepper motor requiring no external logic switching circuitry for operation and capable of rotating a full 360° upon the application of a single pulse.

And it is yet another object of the present invention to provide a new and improved stator structure design for use in certain types of electric rotating machines.

The foregoing and other objectives, features, and advantages of the invention will be more readily understood upon consideration of the following detailed description of the invention, taken in conjunction with the accompanying drawings.

Brief description of the drawing

FIG. 1 is a front view, partially fragmentary, of a first illustrative embodiment of the present invention showing an electric rotating machine suitable for use as either a two-wire stepper or "brushless" DC motor.

FIG. 1a is an enlarged view of a portion of FIG. 1,

FIG. 2 is a side sectional view, taken along the line 2—2 of FIG. 1, showing details of the machine's rotor assembly, FIG. 3 is a front view, partially fragmentary, of a second illustrative embodiment of the present invention, FIG. 4 is a side sectional view taken along the line 4—4 of FIG. 3, FIG. 5 is a front view of a third illustrative embodiment of the present invention, FIG. 6 is a sectional top view taken along the line 6—6 of FIG. 5, FIG. 7 is a front view of a fourth illustrative embodiment of the present invention, FIG. 7a is an enlarged view of a portion of FIG. 7, FIG. 8 is a side sectional view taken along the line 8—8 of FIG. 7.

Description of the preferred embodiment

Figure 9:
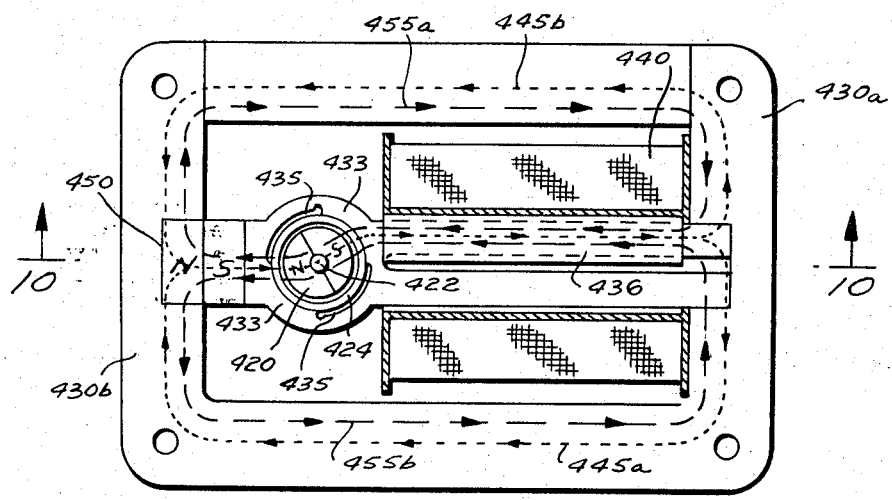
FIG. 9 is a front view of a fifth illustrative embodiment of the present invention.

Referring now to the figures, FIGS. 1, 1a, and 2 show an illustrative embodiment of the invention suitable for use as either a two-wire stepper or "brushless" DC motor. In this form, the motor comprises a generally C-shaped stator frame formed of two members 30a, 30b which are made from laminated stampings of suitable metallic material, for example, low carbon or mild silicon steel. The laminations are secured together in the conventional manner by suitable fastening means such as eyelet rivets. Encircling the central portion of the stator frame is a bobbin 42 on which is wound a two-terminal field coil 40 for energization from a source of electric potential as will be hereinafter explained.

The left-hand stator frame member 30b terminates at the distal end from the field coil 40 in a pole 31 which is bifurcated into two branches 32a and 32b. Similarly, the right-hand stator frame member 30a terminates in a pole 33 split into branches 34a and 34b. Centered inside the generally circular arc described by the contiguous faces of the poles 31 and 33 is the rotor assembly 20 which is rotatably supported by a shaft 22 carried on bearings 26 contained within a rotor housing 24 of brass or other suitable nonferrous material.

In a preferred embodiment the rotor assembly comprises a relatively slender cylinder of magnetized material possessing a high B-H energy product, i.e., high residual flux and high coercivity, as well as other good magnetic characteristics. High coercivity is an especially desirable property for a permanent magnet material for use in the rotor assembly of the present design in view of the alternating magnetic field and other de-magnetizing influences to which the rotor magnet is exposed both in operation and at rest. Since the magnitude of the rotor flux has an important effect on the resulting torque output of the motor, it is desirable that the magnet material selected for the rotor also possess high residual induction.

One new type of magnet material which meets the above requirements for a rotor magnet material is a composition of 77% platinum and 23% cobalt by weight which is manufactured by The Hamilton Watch Co. of Lancaster, Pa. and the Arnold Engineering Co. of Marengo, Ill. Typical magnetic characteristics of this new magnet material are tabulated below:

Residual induction, $B_r$: 6400 gauss.

Coercive force, $H_c$: 4300 oersteds.

Maximum energy product, $B_d\text{-}H_d$: $9.0 \times 10^6$ gauss-oersteds.

As the energy product of this new platinum-cobalt material is from three to nine times greater than those of conventional rotor magnet materials, the rotor flux in the stator-rotor air gap, and hence the torque of the motor, are increased proportionally when a rotor of this material is substituted.

Another magnet material which we have found to be especially advantageous is a straight-line oriented barium ferrite material having an energy product on the order of $3.0 \times 10^6$ gauss-oersteds along the axis of orientation. This anisotropic ferrite material, which is marketed by Indiana General Corp., Valparaiso, Ind., under the trademark "Index VI," and by Stackpole Carbon Co. of St. Marys, Pa., under the trademark "Ceramagnet O," may be readily adapted for use in the two-pole rotor assemblies of the present motors by making the axis of magnetic orientation coincident with a diameter of the cylindrical rotor.

As indicated schematically in FIGS. 1 and 1a, a pair of opposite-polarity magnetic poles are induced in the rotor magnet material. The shape of the two pole regions is such as to divide the rotor 20 into two semi-cylindrical magnetized sections extending the length of the rotor. When the rotor magnet is comprised of a magnetic material of high coercivity, the two regions of opposite magnetic polarity may be placed very close to each other without deleterious effect, and therefore each pole may extend over a relatively wide arc (substantially 180°) of the rotor periphery.

In order to obtain a unidirectional starting characteristic, this exemplary motor embodiment is provided with a pair of shading rings 36a, 36b. Each of the shading rings encircles one of the two branches of its respective bifurcated stator poles 31, 33. Thus, shading ring 36a encompasses the lower branch 32b of the left-hand pole 31, and shading ring 36b embraces the upper branch 34a of the right-hand pole 33.

This arrangement, wherein the pole branches which are shaded are diametrically opposed across the rotor member 20, serves to shift the direction of the stator flux passing though the rotor-stator air gap 35 from the unshaded branches 32a, 34b towards the shaded branches 32b, 34a as the flux builds up during starting. Accordingly, this shift in direction due to the delayed build-up of stator flux in the shaded portions of the stator poles will impart a unidirectional starting characteristic to the motor in a manner well-understood by those conversant with the art. Furthermore, on deenergization of the motor, these same shading rings 36a and 36b assist in bringing the motor to a rapid stop through the electrodynamic braking action produced by the currents induced therein as the rotor revolves.

By making the air gap 35 between the rotor periphery and the stator poles of non-uniform dimension, wherein the spacing from the rotor to the faces of the shaded poles 32b, 34a is significantly smaller than that to the faces of the unshaded poles 32a, 34b, the rotor will consistently stop, upon de-energization of the motor, at the quiescent position shown. That is to say, the paths of minimum reluctance for the rotor flux, as a result of this non-uniform air gap configuration, are such that the rotor will consistently assume a quiescent position wherein the respective centers of the magnetized rotor pole regions will be situated directly underneath the face of the shaded, rather than the unshaded, pole branches. Accordingly, upon starting, the stator flux, which is initially directed along a line passing through the unshaded pole branches 32a, 34b, will have a component in the tangential direction relative to magnetic poles of the rotor, and rotational movement of the rotor in the desired direction will occur.

On the other hand, in the absence of a non-uniform air gap spacing of the nature specified, it would be possible for the rotor to assume a quiescent position wherein the center of its pole regions were aligned directly underneath the faces of the unshaded poles (i.e., a rotor position shifted 90° from that shown in FIG. 1); in such case the rotor would start, but would rotate in the reverse, or undesired, direction. Hence the presence of shading rings 36a and 36b alone would not ensure reliable unidirectional starting of the motor. It is only through the cooperative combination of the shading rings and the low reluctance paths provided by the non-uniform air gap construction described, whereby the rotor consistently assumes a quiescent position favorable to starting, that a reliable unidirectional starting characteristic is achieved.

Continuing now with the description of the particular motor embodiment shown in FIGS. 1, 1a, and 2, which is designed for use as a two-wire stepper motor, there is located between the field coil assembly 40 and the rotor assembly 20 of the motor a permanent magnet member 50 which bridges the space between the respective leg members 30a, 30b of the stator frame. This member 50, which may be comprised of any suitable permanent magnet material, for example, high carbon or Alnico steel, generates a magnetic "bias" flux which flows through the magnetic circuit of the motor along two principal flux paths whose directions are indicated schematically by the dashed lines 55a and 55b in FIG. 1.

One portion of the bias flux flows along a path 55b from the N (north) pole of the bar magnet 50, first downwardly in the leg portion 30a of the stator frame, horizontally through the central portion of the stator frame which contains an air gap 60 for limiting the amount of flux following this path, and then upwardly through the opposite leg 30b of the stator frame to return to the S (south) pole of the magnet. The second and greater portion of the bias flux flows along a path 55a from the N pole of the magnet 50, upwardly through the leg 30a of the stator frame into the stator pole 33, horizontally across the air gap 35 into the rotor 20, diametrically through the body of the rotor and across the air gap on the other side into the opposite stator pole 31, and then downwardly through the leg 30b to return to the S pole of the magnet.

In the quiescent condition, that is, with the field coil 40 of the motor de-energized, the direction of the flux from the magnet 50 which passes through the rotor 20 is such that the rotor 20 assumes the alignment shown in FIG. 1. In this orientation the S region of the rotor is attracted by and aligned opposite the right-hand stator pole 33 which is magnetically connected to the N pole of magnet 50; correspondingly, the N pole of the rotor is aligned opposite the left-hand stator pole 31 which is linked to the S pole of the bias magnet. Each and every time that the field coil is de-energized, and the motor returns to the quiescent condition, the rotor member 20 assumes this same orientation. That is, each of the polarized N and S regions on the rotor is aligned opposite the respective stator pole which is of different magnetic polarity by reason of its linkage to the bias magnet member 50.

Upon energization of the field coil 40 with an electrical pulse of predetermined polarity and amplitude, a second magnetic flux is produced in the magnetic circuit of the motor which flows through the rotor member 20 in a direction directly opposite that of the bias flux produced by the permanent magnet member 50. For the assumed magnetic polarities shown in FIG. 1, the polarity of the applied pulse would be such so as to make the left-hand side of the field coil bobbin 42 a north pole, and the right-hand side a south pole. Thus, as indicated schematically by the dotted lines 45a and 45b, the field coil flux would flow from the north or left side of the field coil 40 dividing between two principal paths in the motor's magnetic circuit. A substantial portion of the field coil flux flowing upwardly in the leg member 30b of the stator frame would follow path 45a, passing through the bias magnet member 50, and then downwardly through the stator leg 30a returning to the right or south side of the field coil. The remainder of the field coil flux would continue along path 45b, flowing up into the stator pole 31, across the stator-rotor air gap 35 and diametrically through the body of the rotor 20, next across the air gap on the opposite side of the rotor into the stator pole 33, and then returning to the south side of the coil via leg 30a.

It will be observed from the schematic representation in FIG. 1 that the respective directions of the fluxes flow in the magnetic circuit of the motor are such that the field coil flux is in opposition to the bias flux in the stator-rotor air gap 35, but that both flow in the same direction through the permanent magnet member 50. Thus, in this motor embodiment of the present invention, the respective flux paths for the field coil (45a, 45b) and the permanent magnet (55a, 55b), while passing through the rotor member 20 in opposite directions, are in parallel with each other throughout the remainder of the magnetic circuit of the motor. This so-called "parallel arrangement" of the field coil and bias magnet fluxes minimizes the demagnetizing effect on the permanent magnet 50 of the flux generated by the field coil 40.

The amplitude of the field coil flux 45b flowing in the stator poles 31, 33 is chosen so as to be sufficiently large to momentarily cancel out the influence in the air gap 35 of the bias flux 55a from the permanent magnet 50, and produce a net magnetic field in the opposite direction through the rotor member 20. This reversal in direction of the composite stator flux acting on the rotor member 20 produces forces of magnetic attraction and repulsion on the magnetized pole regions of the rotor which cause this member to rotate 180° in space. That is, the respective N and S regions on the rotor effectively exchange positions as the rotor member turns to line up in accordance with the reversal in the magnetic flux flow through the stator pole pieces 31 and 33.

So long as the pulse of electrical energy applied to the field coil 40 is of sufficient amplitude to produce a composite flux through the rotor 20 in a direction opposite that of the bias flux, the rotor will remain in this new position, displaced 180° from its original or quiescent orientation. However, upon termination of the applied pulse and de-energization of the field coil, the flux flowing through the magnetic circuit of the motor reverts to that provided by the permanent magnet member 50 alone. Since the flow of the bias flux through the rotor member 20 is oppositely directed from that produced by the field coil, a second reversal now occurs in the net flux flow through the air gap 35, and the rotor revolves an additional 180° to assume an equilibrium orientation with respect to the changed direction of the stator pole flux.

It is to be also pointed out that the presence of the biasing flux from the permanent magnet member assists the rotor in coming to a rapid stop after the electrical energizing pulse is removed from the field coil since any tendency for the rotor to turn more than 180° beyond the quiescent position is prevented by the interaction of the biasing flux with the magnetized pole regions of the rotor.

By reason of the unidirectional starting characteristic provided by the shading rings 36a, 36b and the design of the branch terminations of the stator poles 31 and 33 to provide a non-uniform configuration of the air gap 35, the rotational advance of the rotor member 20 upon each reversal of flux will always be in the same direction, and thus additive. In a two-pole rotor of the type shown in the figures, this second advance of the rotor, due to the reversal of the flux in the air gap 35 which occurs upon the termination of the energizing pulse to the field coil 40, completes a full cycle of revolution and returns the rotor to the quiescent position it occupied just prior to the application of the energizing pulse. In other words, the rotor member turns 180° when the energizing current is applied to the field coil 40, and a further 180° when the current is removed. The rotor thus rotates a full 360° upon the application of each pulse.

The teachings of the present invention also are pertinent to motor embodiments comprised of rotor members having more than one pair of rotor poles. For example, if it be assumed that the rotor member 20 of the motor embodiment of FIG. 1 is modified so as to have three pairs of poles of opposite magnetic polarity equally spaced about its periphery, then a 120° rotation of the rotor will be produced by each pulse. That is to say, upon the commencement of the pulse (and the first reversal of pole flux flow), the rotor progresses 60°, and upon the termination of the pulse (causing the second flux reversal), the rotor advances a further 60°. Thus, while the rotor has advanced only 120 mechanical degrees, it has effectively completed a full cycle of 360 electrical degrees.

FIGS. 3 and 4 show a second illustrative embodiment of the present invention which is a modification of the embodiment of FIGS. 1–2, wherein the bias magnet member 150 has been moved from its position between the coil assembly 140 and the rotor assembly 120 and placed outside the stator frame of the motor. Otherwise this embodiment is identical in all respects to that shown in FIGS. 1–2, and corresponding elements in this latter embodiment bear the same reference numerals increased by 100. It is to be noted that, in this modified embodiment, while the permanent magnet member 150 is located external to the stator frame, the respective flux paths for the field coil (145a, 145b) and the permanent magnet (155a, 155b) remain in parallel with each other throughout the major portion of the motor's magnetic circuit with the exception of the oppositely-directed flux lines passing through the stator pole pieces 131, 133, the stator-rotor air gap 135, and the rotor assembly 120.

FIGS. 5 and 6 illustrate a third embodiment of the present invention wherein the field coil 240 is located immediately adjacent to the rotor assembly 220 and the respective flux paths of the field coil (245a, 245b) and the permanent magnet member (255a, 255b) are in parallel arrangement. The stator frame pieces 230a, 230b, together with the permanent magnet member 250, form a rectangular guard structure which surrounds and protects the field coil 240 and rotor assembly 220 enclosed inside. Again, elements of the motor structure corresponding to those described in the embodiment of FIGS. 1–2 bear the same reference numerals increased by 200. The principal difference in this design over the embodiments shown in FIGS. 1–2 is the use of a unitary stator pole member 233; however, the operational advantages remain the same as previously described.

FIGS. 7, 7a, and 8 depict a fourth illustrative embodiment of the present invention wherein the respective flux paths of the permanent magnet member (350) and field coil (345) are in "series arrangement." In this particular embodiment, the permanent magnet member 350 is in the form of a flexible band of permanent magnet material situated in the air gap 335 between the pair of stator poles 331, 333 and encircling the cylindrical housing 324 containing the rotor member 320. The band of permanent magnet material 350 is magnetized, as shown schematically in FIG. 7d, into two semicircular regions of opposite (N and S) magnetic polarity so that a bias magnetic field is directed through the rotor member 320 and the stator-rotor air gap 335 in the direction indicated by the dashed line 355.

The location of the bias magnet 350 immediately adjacent to the rotor assembly 320 in the stator-rotor air gap 335 is a highly efficient form of series biasing and permits a marked reduction in the size, weight, and magnetic strength requirements of the permanent magnet member used to generate the bias flux.

The flux generated by the field coil 340 follows a path 345 through the motor's magnetic circuit in a direction as would tend to oppose the bias flux 355 and demagnetize the permanent magnet member 350. In such a series arrangement of the magnetic fluxes, the M.M.F. (magnetomotive force) provided by the field coil 340 must overcome the M.M.F. of the bias magnet member 350 in order to reverse the direction of the composite flux present in the stator-rotor air gap 335 in accordance with the stepper motor operation described earlier. This reversal of the air gap flux in turn tends to demagnetize the permanent magnet member 350 as it is driven into the third quadrant of its B-H magnetization curve. Therefore, in preferred embodiments of the present invention employing a series arrangement of flux paths, it is desirable that a permanent magnet material having a very high intrinsic coercivity, that is, a relatively flat demagnetization characteristic, be used for the bias magnet member 350. One such material found especially suitable for application in such motor embodiments is an anisotropic rubber-bonded barium ferrite material marketed under the name "Plastiform 1H" and manufactured by Leyman Corporation of Cincinnati, Ohio.

Figure 10:
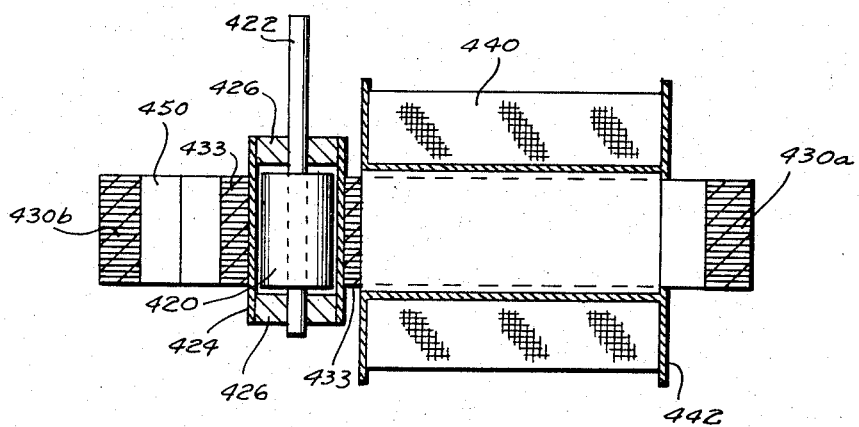
FIG. 10 is a top sectional view taken along the line 10—10 of FIG. 9.

FIGS. 9 and 10 show a fifth illustrative embodiment of the present invention which is generally similar to the embodiment shown in FIGS. 5 and 6 except that the magnetic flux paths of the permanent magnet member 450 and the field coil 440 are in series relationship in the motor's magnetic circuit and are both located adjacent the rotor assembly 420 to provide increased efficiency and higher flux in the stator-rotor air gap 435. The flux lines (455a, 455b) of the permanent magnet member 450 and the flux lines (445a, 445b) of the field coil 440 both follow the same paths, but in opposite directions, throughout the magnetic circuit of the motor. In such a series arrangement it is desirable to utilize a magnetic material having a high coercivity characteristic, such as barium ferrite, for the permanent magnet member 450.

Numerous electrical or electromechanical circuits suitable for converting a source of alternating or direct-current electrical potential into a series of unipolar electrical pulses for application to the field coil circuit of the stepper motor or "brushless" DC motor embodiments of the present invention will readily occur to those skilled in the art.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. In an electrical motor of the type having a stator structure of magnetic material terminating in at least a pair of oppositely-disposed stator poles separated by an intervening air gap; a field coil encircling a portion of said stator and generating magnetic flux in said stator when said field coil is energized with pulses of electrical potential; a rotor member of permanent-magnet material having at least one pair of poles thereon of opposite magnetic polarity and rotatably mounted in the air gap between the poles of said stator structure in the path of a principal portion of said stator flux; and a permanent-magnet member for generating a biasing magnetic flux passing through said rotor which is of lesser strength and opposed to said stator flux flowing through said rotor when said field coil is energized, whereby each pulse of electrical potential applied to said field coil produces a rotor rotation of 360 electrical degrees, and wherein said bias flux is arranged in series with said stator flux and directed in opposition thereto across said permanent-magnet member; characterized by the improvement that said permanent-magnet member, whose magnetic flux is in series arrangement with that of said field coil, is located in said air gap between said stator structure and said rotor member.

2. An electrical rotating machine according to claim 1 wherein said permanent-magnet member is in the form of a thin annular ring situated in the air gap between said poles of said stator and encircling said rotor.

3. An electrical rotating machine according to claim 2 wherein said permanent-magnet member is further characterized as being comprised of a bonded ferrite material having a high intrinsic coercivity characteristic for resisting demagnetization when subjected to opposing external flux.

4. A stepper motor comprising
(a) a stator structure of magnetic material;
(b) a field coil encircling a portion of said stator and generating magnetic flux in said stator when said field coil is energized with externally-derived pulses of electrical potential;
(c) a rotor of permanent-magnet material having at least a pair of poles thereon of opposite magnetic polarity, said rotor being situated in the path of a principal portion of said stator flux and separated from said stator structure by an air gap;
(d) a permanent-magnet member for generating a biasing magnet flux passing through said rotor, the strength and direction of said bias flux through said rotor being respectively lesser than and opposed to said stator flux flowing through said rotor when said field coil is energized;
(e) means on said stator structure magnetically cooperating with said stator and bias fluxes for ensuring self-starting and unidirectional rotation of said rotor; whereby each of said pulses of electrical potential applied to said field coil produces a step-wise rotor advance of 360 electrical degrees consistently in the same direction, and whereby the respective magnetic flux paths for said field coil and said permanent-magnet member, while passing through said rotor member in opposite directions, are in parallel arrangement and flow in the same direction substantially throughout the remainder of said stepper motor's magnetic circuit, thereby minimizing the magnetizing effect on said permanent-magnet member when said field coil is energized by said pulses.

5. The stepper motor of claim 4 further characterized in that the magnetic flux produced by the energization of said field coil flows through said permanent-magnet member in the direction as would tend to increase the magnetization state of said member.

6. In a stepper motor of the type having a stator structure of magnetic material terminating in at least one pair of oppositely-disposed stator poles; a field coil encircling a portion of said stator and generating magnetic flux in said stator when said field coil is energized with externally-derived pulses of electrical potential; a rotor of permanent-magnet material having at least a pair of poles thereon of opposite magnetic polarity, said rotor being situated in the path of a principal portion of said stator flux and separated from said stator structure by an air gap; and a permanent-magnet member whose poles are coupled respectively in a magnetic circuit to said stator poles for generating a biasing magnetic flux of predetermined strength and direction passing through said rotor so that each of said pulses of electrical potential applied to said field coil produces a step-wise rotor advance of 360 electrical degrees; characterized by the improvement that a substantial variation in the size of said air gap is provided along the pitch face of each of said stator poles so that a preferred path of minimum reluctance is established for said biasing magnetic flux between portions of the respective faces of each of said stator poles and said rotor, whereby, upon de-energization of said field coil, the rotor will consistently assume a quiescent stopping position of the same electrical orientation with respect to said stator poles wherein at least some of said rotor poles are directly aligned, respectively, under said stator pole face portions and along said preferred path for said biasing flux, with a rotor pole of a given polarity always aligning opposite a stator pole which is coupled to a pole of said biasing permanent magnet member which is of opposite magnetic polarity; and a magnetic flux shading means is provided on said stator structure for momentarily delaying the build-up of stator flux in said respective stator pole face portions whereby, upon energization of said field coil, said stepper motor will, by reason of said favorable stopping position, be self-starting and unidirectional.

7. A stepper motor according to claim 6 further characterized in that said substantial variation in air gap size is produced by having each of said stator poles divided into at least two branches of dissimilar length, with the longer branch extending closer to said rotor than the other and similar branches of said respective poles being diametrically opposed across said rotor, and said magnetic flux shading means is in the form of a ring disposed about each of said longer branches of said bifurcated stator poles.

8. The stepper motor of claim 4 further characterized in that said stator structure terminates in a pair of confronting stator poles between which said motor is mounted, said rotor being formed of a cylindrical, substantially solid cylinder of magnetized, high energy product material and consisting of a single pair of pole regions of opposite magnetic polarity, whereby each of said electrical pulses applied to said field coil produces a full cycle (360 mechanical degrees) of rotation of said rotor.

References Cited

UNITED STATES PATENTS

| | | | |
|---|---|---|---|
| 2,101,665 | 12/1937 | Arey | 310—163 |
| 2,864,018 | 12/1958 | Aeschmann | 310—49 |
| 2,867,762 | 1/1959 | Lehman | 310—49 |
| 2,890,400 | 6/1959 | Cluwen | 318—254 |
| 2,968,755 | 1/1961 | Baermann | 310—163 |
| 3,042,818 | 7/1962 | Busch | 310—49 |
| 3,077,546 | 2/1963 | Schroter | 310—49 |
| 3,119,941 | 1/1964 | Guiot | 310—49 |
| 3,142,774 | 7/1964 | Lundin | 310—83 |

ORIS L. RADER, *Primary Examiner.*

G. SIMMONS, *Assistant Examiner.*